United States Patent
Luongo et al.

(10) Patent No.: US 8,321,281 B2
(45) Date of Patent: Nov. 27, 2012

(54) AUTOMATED SALES TAX PAYMENT SYSTEM

(75) Inventors: Pino Luongo, Purchase, NY (US); Jack Kane, Bedford, NH (US)

(73) Assignee: Stac Media, Inc., Bronx, NY (US)

( * ) Notice: Subject to any disclaimer, the term of this patent is extended or adjusted under 35 U.S.C. 154(b) by 120 days.

(21) Appl. No.: 12/859,609

(22) Filed: Aug. 19, 2010

(65) Prior Publication Data

US 2012/0047034 A1    Feb. 23, 2012

(51) Int. Cl.
*G06Q 20/00* (2012.01)

(52) U.S. Cl. ............... 705/15; 705/17; 705/19; 705/1.1; 705/34; 235/380; 714/4

(58) Field of Classification Search .................. 705/15, 705/34, 37, 39; 235/380
See application file for complete search history.

(56) References Cited

U.S. PATENT DOCUMENTS

| | | | |
|---|---|---|---|
| 2005/0187842 A1* | 8/2005 | Grear et al. ..................... | 705/35 |
| 2008/0249848 A1* | 10/2008 | Kay et al. ........................ | 705/14 |
| 2009/0055276 A1* | 2/2009 | Dunsmore et al. .............. | 705/15 |
| 2009/0076941 A1* | 3/2009 | Schneierson et al. .......... | 705/37 |
| 2009/0240610 A1* | 9/2009 | Barsade ........................... | 705/31 |

* cited by examiner

*Primary Examiner* — Vanel Frenel
(74) *Attorney, Agent, or Firm* — Leason Ellis LLP

(57) ABSTRACT

A computer-implemented transaction processing system includes a card reader and a plurality of modules each comprising code that executes in the processor. The card reader transfers credit card data from a credit card of a customer to a memory of the computer. A check presentation module is operative to calculate a sales tax associated with a price of a product sold to the customer. An approval module is operative to obtain an approval against the credit card data in the memory for at least the price of the product and the sales tax and thereby define an approved sale transaction. A revenue settlement module and a tax settlement module are operative to settle respective portions of the sales transaction(s) to different accounts, such that a revenue portion goes to a first account free of any sales tax, and a sales tax portion goes to the other account.

28 Claims, 4 Drawing Sheets

24/B

Touch an itemto see item commands

1

| CAF/SOUP | $9.00 |
| seat 1 | |
| CAF/SOUP | $9.00 |
| seat 2 | |
| ++++++++++ | $0.00 |
| ++++++++++ | $0.00 |
| CAF/SAL, ROAST, BEETS | $8.50 |
| DOS | |
| seat 1 | |
| CAF/SAL, CENTO, CAFE | $7.50 |
| seat 2 | |
| FIRE  $7.50 | $0.00 |

...

| Subtotal: | $34.00 |
| Taxes: | $3.02 |
| Total: | $37.02 |
| Amount Due: | $37.02 |

Page 1 of 2

| 215983 | post | JAVIER PREG. | $45.02 |

AUTOMATED SALES TAX PAYMENT SYSTEM

FIELD OF INVENTION

The present invention relates to systems in support of retail commerce, and, more particularly, to a transaction processing system that is suitable for use by merchants in the restaurant, hospitality and retail industry to manage tax payments in connection with each non-cash tender retail transaction.

BACKGROUND OF THE INVENTION

In the retail sector, customers purchase goods and services using cash, credit cards, or debit cards. While some purchases are not subject to taxation, most are. Food and beverage purchases in a restaurant, for example, can be subject to state and local sales taxes.

For each sales transaction that is subject to taxation, a merchant is legally obligated to pay tax at a rate that is set based on the location of the retailer. Thus, in New York City, there may be one rate, whereas in a suburban community outside New York City but still in the state of New York, there may be a different rate, whereas the same sales might not be subject to tax at all in a different state or during a state-sponsored promotional period to encourage shopping.

Merchants are obtained to collect tax from their customers. The collected tax is subject to voluntary reporting, yet the monies collected are co-mingled with other funds collected from operation of the retail enterprise. Meanwhile, the merchant has operating expenses in connection with running the business, such as payroll, inventory, rent, electricity, information services, franchise fees, and so on. It is important for the merchant to maintain accurate accounting records so that the business is not supported by tax revenue that is being held by the merchant until its next tax payment (typically, a monthly or a quarterly payment).

When the sales transaction is made in cash, the merchant receives monies sufficient to cover the sales price and any taxes collected from the customer. When the sales transaction is made by the customer tendering a transaction card (that is, either a debit or credit card), the merchant receives monies in the faun of additions to its bank balance in the amount of the sales price and any taxes collected from the customer.

It would be an improvement in the art of such transaction processing to avoid co-mingling for as many sales transactions as possible. It would be a further improvement in the art if the tax revenue collected from a customer were not co-mingled with sales revenue collected by the merchant. Still a further improvement in the art would be a system that transfers to a taxing authority on an automated basis as much of the collected tax as possible substantially when the merchant's bank account is credited with the sales transactions with its customers. The present invention addresses these and other needs in the art.

SUMMARY OF INVENTION

In accordance with one aspect of the present invention, a transaction processing system suitable for a merchant in the restaurant, hospitality and retail industry includes a computer having a processor, a memory and a connection to a network, a card reader connected to the computer, and a plurality of modules each comprising code that executes in the processor. The card reader transfers credit card data from a credit card of a customer to the memory of the computer in a conventional manner. Among the plurality of modules, there is a check presentation module which is operative to configure the processor to calculate a sales tax associated with a price of a product sold to the customer. There is also an approval module which is operative to configure the processor to obtain an approval against the credit card data in the memory for at least the price of the product and the sales tax and thereby define an approved sale transaction. There are also a revenue settlement module and a tax settlement module, optionally, as part of a separator module.

The revenue settlement module is operative to configure the processor to settle a revenue portion of one or more approved sales transactions in favor of a first account accessible over the network and belonging to the merchant. The revenue portion excludes the sales tax portion. Meanwhile, the tax settlement module is operative to configure the processor to settle the sales tax associated with the one or more approved sales transactions in favor of a second account accessible over the network, wherein the second account is different than the first account.

These and further aspects, features and advantages of the present invention will become more apparent from the following detailed description when taken in connection with the accompanying drawings which show, for purposes of illustration only, a preferred embodiment of the present invention.

DETAILED DESCRIPTION OF CERTAIN EMBODIMENTS

By way of overview introduction, the present invention provides improvements in transaction processing by isolating sales revenue from any tax collected by the merchant, such as a merchant in the restaurant, hospitality or retail industry. By isolating the sales tax from the revenue portion of a sales transaction, the merchant can manage its business without risk of shortfalls that can result by having the sales tax comingled with sales revenue. This can be a vital improvement for some merchants who are not well schooled in accounting. Equally important, however, is the fact that the isolated tax stream can be provided to a taxing authority on a per-transaction, per-day, per-week, or per-month basis, for example, rather than on a quarterly basis, which is a great advantage to the taxing authority.

Figure 1:
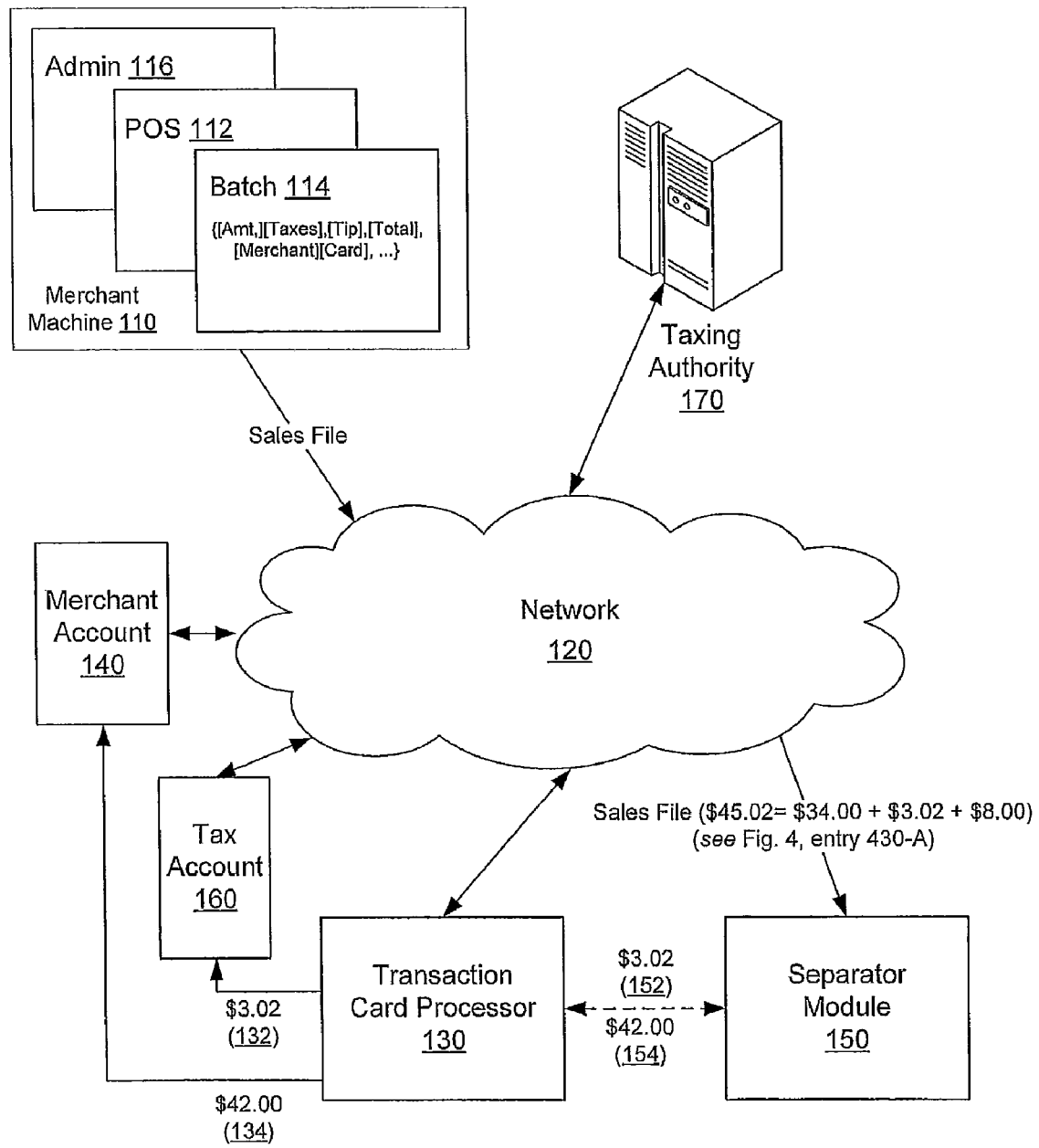
FIG. 1 illustrates a system arrangement in which a merchant machine connects to a transaction processing module, in accordance with one embodiment of the invention, prior to processing by a transaction card processor.

In FIG. 1, a merchant machine 110 comprises a computer system having network connectivity such as through a wired (e.g., 10/100 Ethernet) or wireless (e.g., IEEE 801.11g) connection to a network 120. The merchant machine includes a processor, memory, and conventional input/output devices such as a touch screen display. Code is loaded or otherwise accessible to the processor and executes to configure the processor as a point of sale device, in the case of POS module 112, or as a transaction processor in the case of Batch module 114, or as an editor in the case of the administrative module 116. Additional modules can be provided, as understood by those of skill in the art, so as to support interactivity with the touch screen or other input/output device, to support communications by and between the modules and over the network 120, to manage data, backups, reporting, and so on.

For instance, the code that comprises the POS module(s) 112 can comprise "Dinerware," by Dinerware, Seattle, Wash. This software provides a restaurant POS system featuring ticket handling, order routing, menus, business policies, labor management functionality, and so on. Other POS software can be used in the merchant machine 110 with equal advantage, including, by way of example and not limitation, "PointOS Professional" by PointOS, "Halo" by Vivonet, and "Cash Register Express" by PC America. As another example, the code that comprises the transaction module(s) 114 can comprise "Slipstream" by Midnite Express, Inc. of Myrtle Beach, S.C. The "Slipstream" software provides transaction processing system suitable for multiple credit card, gift, and loyalty card usage, including, in relevant part, batch processing of sales transactions to third-party transaction card processing facilities. The administrative module(s) 116 can comprise code that is a part of the POS or batch software, and generally designates functionality that can support configuration of the interface including the buttons and their labels, password management, licensing, setting of tax rates, pre-set gratuity levels, gift certificate processing, and other settings that the merchant might configure and save in a profile associated with a particular establishment or a chain of retail establishments.

Conventionally, the merchant machine 110 communicates over the network 120 to a transaction card processor 130 which receives a sales file output by the merchant machine and processes one or more sales transactions in the sales file so as to credit a merchant account 140 (which includes the data 430 in several rows of the interface 400). There are many transaction card processors 130 around the U.S.A. and all over the world that receive such files and perform merchant services such as processing third-party transactions and attending to interchange fees and other service charges, chargebacks and reversals, if any. For instance, First Data Merchant Data Services Corporation ("First Data"), 5th 3rd, Heartland, American Express CAPN, etc. The merchant account can be an account at any traditional or online banking institution. The merchant account 140 is characterized by having a routing number and an account number. Together, these numbers enable funds to be directed from the transaction card processor 130 to a particular account associated with the merchant.

Figure 2:
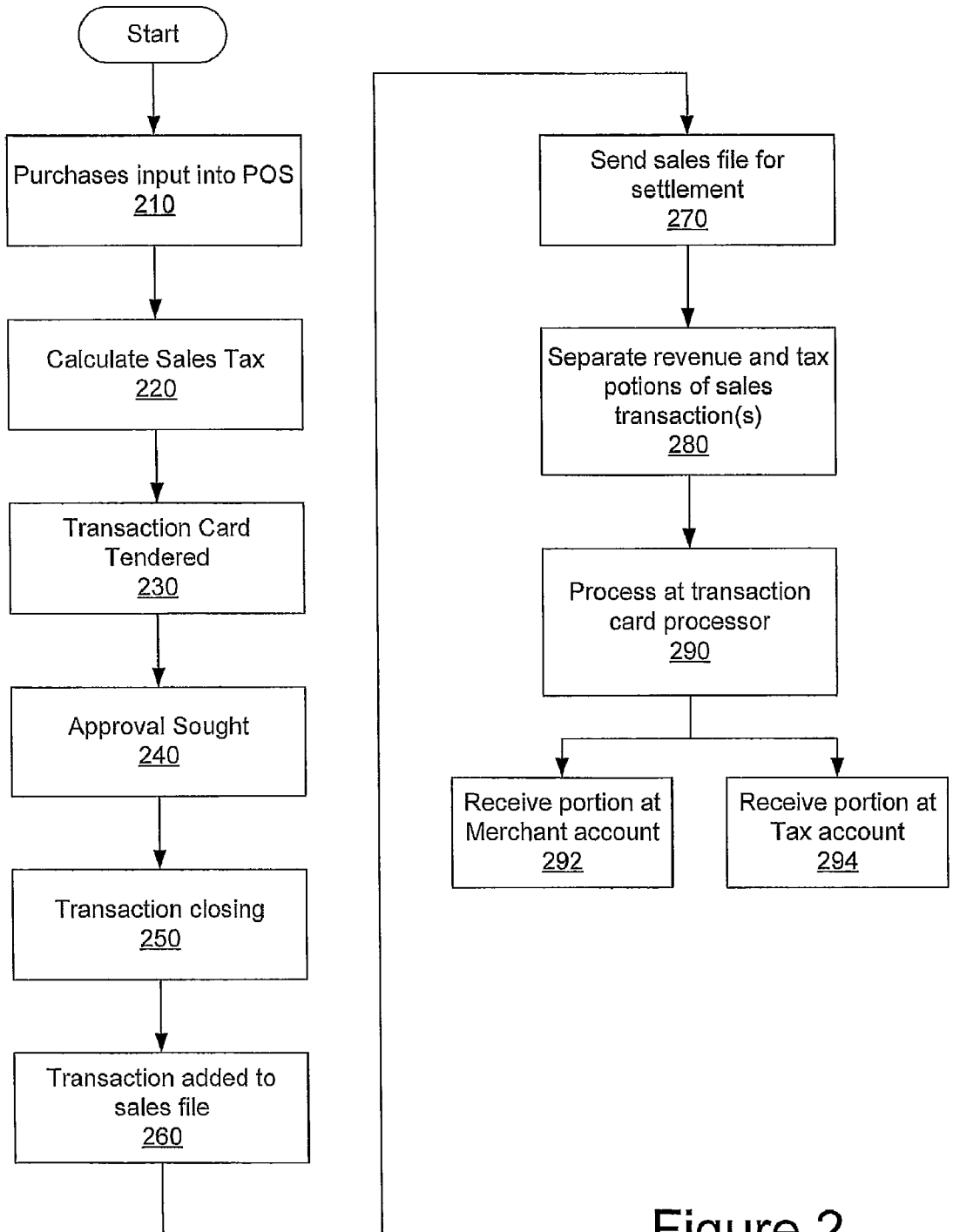
FIG. 2 depicts a flow diagram illustrating a process by which sales transactions are managed.
Figure 3:
FIG. 3 depicts a customer invoice for a sales transaction that has not closed.
Figure 3:
Figure 3:

Turning briefly to FIG. 2, a first portion of a process flow 200 (steps 210 through step 270) illustrates a conventional sales transaction by a customer with a merchant using a credit card. A customer makes purchases at a merchant in a conventional manner. The purchase can be for goods or services. For instance, the purchase can be food (soup, appetizer, drink) from a restaurant. The customer's choices are input into a POS system at step 210. In FIG. 3, the POS system comprises the aforementioned Dinerware software that is executing for the benefit of the restaurant, such as in a machine located at the site of the restaurant. The purchases subtotal to $34.00. At step 220, tax is calculated such as by operation of a check presentation module comprising code executing in the machine that implements the POS in relation to the price of a product sold to the customer for the particular location of the retailer. The taxes are calculated (e.g., $3.02), and the calculated amount is added to the subtotal to yield a total amount due ($37.02 in the illustrated example).

If the customer tenders cash, the invention has no applicability. However, when the customer wishes to pay using a transaction card, or several transaction cards as when the cost is split among several people, the transaction card is tendered as shown at step 230 by causing the card to be swiped or otherwise read (e.g., using a near-field RFID technology). More generally, a card reader is connected to the computer providing the POS functionality and the card reader transfers transaction card data from a credit card of a customer to a memory of the computer.

As indicated at step 240, approval of the tendered card is sought such as by communicating over the network 120 to a transaction card processor 130 associated with the particular card that was tendered (e.g., Visa, MasterCard, American Express, etc.). In a conventional manner, the card processor returns a code if the amount sought for approval is within the credit limit of the credit card, or within the parameters permitted for a debit card, if that was the card that was tendered. In the case of restaurants, the approval may be for an amount that exceeds the purchase amount ($37.02) to ensure that a gratuity (e.g., a 15%-20% overage) can be approved in case the customer adds a gratuity to the purchase amount as is customary for customers of some merchants. An approval module comprising code executing in the machine that implements the POS manages the actions necessary to communicate an amount to the transaction processor for approval against the transaction card data that has been read into the memory of the POS machine and to receive an acknowledgement of the approval. This amount, namely, at least the price of the product and the sales tax, defines an approved sale transaction. The acknowledgements can be stored locally at the merchant site or remotely, along with the sales transaction details with that customer. Among other data concerning the transaction that can be stored are the following (all of which can be part of a sales file later communicated to the transaction processor 130 for settlement):

[Date]
[Time]
[Check]
[User]
[Card]
[Card #]
[Approval]
[Amt.]
[Tax]
[Tip]
[Total]
[Tip %]
[Merchant]
[Other]

If the approval is obtained, then the process flow continues so as to close the transaction, as indicated at step 250. A transaction closing module comprising code executing in the machine that implements the POS operates to fix the total amount of the purchase, any tax, and any gratuities that is being charged to the customer. The transaction closing module can close the sales transaction in an amount up to the approval defined in the approved sale transaction. That total amount, and some or all of the values of the variables listed above, are included in a row of a table or in a record or other data object that is included in a sales file that is communicated over the network 120 to a transaction card processor, typically at the request of the merchant, as indicated at step 270. The sales file is sent out by interacting with a settlement control 410 that is provided within the interface (see FIG. 4). The settlement control is selectable by a user of the transaction processing system (e.g., the POS) to trigger a revenue settlement module, a tax settlement module, or both, to cause a transmission over the network to settle the one or more approved sale transactions. The merchant selects a payment processor, such as one associated with the Visa and Mastercard tenders, for example, by interacting with a check box 420 and can, in a batch mode, send all transactions of that tender type at once, simultaneously (e.g., all of the illustrated transactions in a batch manager window 400). The sales transaction of FIG. 3 is shown in the first row, row 430-A, of FIG. 4. As will be understood from the description that follows, either or both a revenue portion of the sales transaction and applicable sales tax can be sent out by the code of the settlement module, simultaneously, in a batch.

Figure 4:
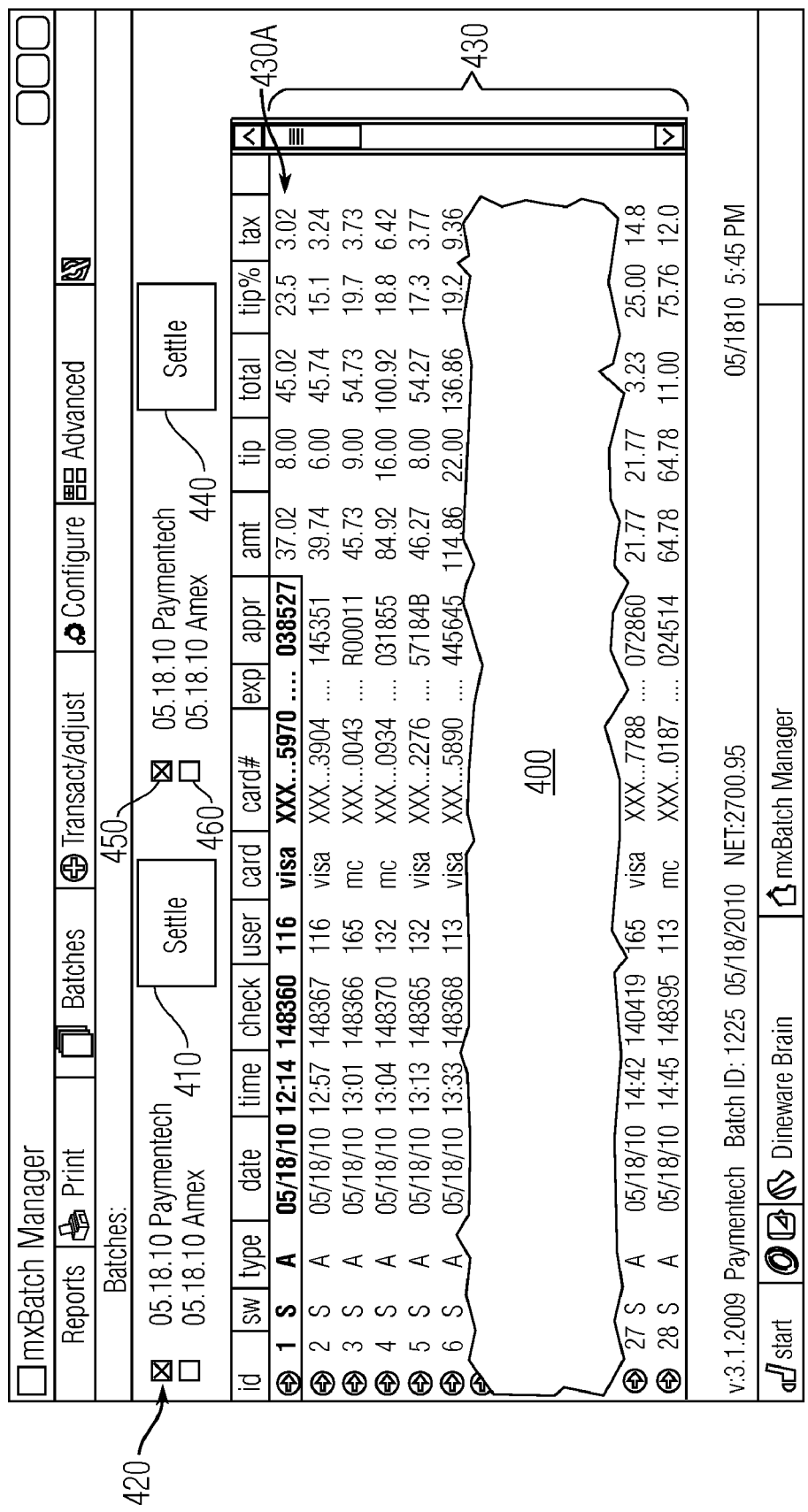
FIG. 4 depicts a screen shot of an interface configured to be used in connection with the invention to transfer revenue and tax portions of one or more sales transactions for discrete, non-comingled processing.

Referring now to FIGS. 1, 2 and 4, in accordance with a salient aspect of the invention, the sales file is processed by a separator module 150 which comprises code executing in a machine and operative to separate sales tax from a revenue portion of the sales transactions. It should be understood that the separator module can be executed on the machine that implements the POS, or can execute on a different machine accessible to the POS over the network 120. For instance, the functionality of the separator module can be a hosted solution that merchants can subscribe to facilitate transaction card processing in a manner that eliminates co-mingling of sales tax with operating revenue.

The code of the separator module 150 comprises a revenue settlement module that is operative to configure the processor of the machine on which it executes to settle a revenue portion of the approved sales transactions included in the sales file. The settlement is in favor of a first account that is accessible over the network, such as the merchant account 140 which belongs to the merchant. The revenue portion of the sales transaction excludes the sales tax, but can include any gratuity or tip, if applicable. (The purchase revenue and any gratuities are managed by conventional POS software, so that the merchant can divide tips among waiters and other staff according to their respective customers served, and/or in accordance with other business rules.) The code of the separator module 150 also comprises a tax settlement module that is operative to configure the processor of the machine on which it executes to settle any sales tax associated with the approved sales transactions in the sales file. The settlement in this regard is in favor of a second account accessible over the network, preferably one that is different than the first account. In one implementation, the settlement to the second account can be to an account of a taxing authority 170, such as tax account 160.

Optionally, when the separator module executes within the machine that implements the POS, the settlement control 410 can be configured to trigger a transfer to the transaction processor 130 just the revenue portion of the sales transaction(s), while a second control 440 can be provided and configured to trigger a transfer to the transaction processor 130 just the sales tax portion of the sales transaction(s) for tenders of one type or another, such as Mastercard and Visa on the one hand by selecting check box 450 (as shown) or American Express by selecting check box 460.

At step 280, the separator module executes to provide to the transaction processor 130 two data sets, one designated to each of the first and second accounts. For instance, the separator module can include a routing number and an account number associated with each of the first and second accounts to the transaction processor 130. The transaction processor is thereby enabled to settle the transactions in the separated sales files to distinct accounts free of any co-mingling of sales tax with sales revenue.

The revenue settlement module and the tax settlement module each are preferably in communication with a database so that the transmission to the transaction processor 130 can forward data useful in settling the sales transactions. In one implementation, the communication to a database comprises the communication of the sales file message from the machine 110 of the merchant to the separator module 150. The sales file or database can provide an identifier of the first account; an identifier of the merchant that caused the transmission; an amount of the revenue portion of the one or more approved sales transactions; an amount of the sales tax associated with the one or more approved sales transactions; a date for each respective one of the one or more approved sales transactions; a time for each respective one of the one or more approved sales transactions; or a selection of these data.

At step 290, the third-party transaction processor receives from the separator module 150 at least two data sets, one concerning a revenue portion of one or more sales transactions and a sales tax portion of the same group of sales transactions. Referring again to the example in FIG. 3, if the communication from the separator module 150 is of one sales transaction rather than a batch of transactions, then the POS provides a sales file to the separator module and the separator module operates to output a divided or otherwise identified version of the sales file with portions suitable for settling both the sales revenue portion (arrow 152) and the sales tax portion (arrow 154). For instance, instead of settling the amount in the "Total" field as received from the POS, the fields can be remapped so that the Total, which is used by the transaction processor 130 has, in the case of the revenue portion, the sum of the Amt and Tip columns (and thus excludes the Tax column), and, in the case of the sales tax portion, the Tax column. In another implementation, the fields are unaltered, but the pertinent fields are identified to the transaction processor for settlement (that is, there is no re-mapping of the columnar data). In still another implementation, the Tax column data is omitted to cause a recalculation of the Total for use in settling the revenue portion of the sales transaction(s), and the Amt and Tip column data are omitted to cause a recalculation of the Total for use in settling the sales tax portion of the sales transaction(s).

Regardless of the approach taken, the transaction processor settles the sales transaction(s) so that the merchant account can receive at step 292 the revenue portion (arrow 134) and so that the second account 160 (e.g., tax account) can receive the sales tax component (arrow 132) of the sales transaction(s) at step 294. As such, the revenue settlement module and the tax settlement module can be understood as being configured, in accordance with the invention, to settle the revenue portion of the one or more approved sales transactions and the sales tax associated with the one or more approved sales transactions free of any comingling of those respective portions of the amount tendered by customer in each closed sales transaction that is not a cash transaction.

As a consequence, the second account has access to monies associated with a tax portion of the sales transactions at a merchant location substantially contemporaneously with the merchant having access to the monies. When the second account is one belonging to a taxing authority, the taxing authority obtains access to tax revenue on a daily, weekly, bi-weekly, or monthly basis rather than a quarterly basis. The merchant, meanwhile can be accorded read access to the second account, or another account that is linked to payments made through the second account, so as to monitor the amount of payments made, say, in a given calendar quarter, and so on.

While certain features of the present invention have been described as occurring on a particular machine, it would be understood by one of ordinary skill in the art that the functions described herein can be performed by various machines, interconnected, and distributed over a network. The determination of which machines perform specific functions is determined by the specific software implementation and supported hardware platforms. Accordingly, the present invention can operate in a centralized environment, wherein a server is responsible for substantially all processing, and the clients display the virtual environment and communicate user-interaction to the server. Alternatively, the present invention can also be practiced in a peer-to-peer environment having little or no centralized processing, wherein the state of each client is shared with its peers as necessary and the simulation of the virtual environment is distributed across the peer network.

While the present invention has been described with respect to certain embodiments thereof, the invention is susceptible to implementation in other ways and manners which are still within the spirit of the invention. Accordingly, the invention is not limited to the described embodiments but rather is more broadly defined by the recitations in the claims appended thereto and equivalents of the recitations therein.

We claim:

1. A transaction processing system suitable for a merchant in a restaurant, hospitality and retail industry, the system comprising:
   a computer having a processor, a memory and a connection to a network;
   a card reader connected to the computer, the card reader transferring credit card data from a credit card of a customer to the memory;
   a plurality of modules each comprising code that executes in the processor, including:
      a check presentation module operative to configure the processor to calculate a sales tax associated with a price of a product sold to the customer;
      an approval module operative to configure the processor to obtain an approval against the credit card data in the memory for at least the price of the product and the sales tax and thereby define an approved sale transaction;
      a revenue settlement module operative to configure the processor to settle, subsequent to an obtaining of the approval against the credit card for the at least the price of the product and the sales tax, a revenue portion of one or more approved sales transactions in favor of a first account accessible over the network, the first account belonging to the merchant, wherein the revenue portion excludes the sales tax; and
      a tax settlement module operative to configure the processor to settle, subsequent to an obtaining of the approval against the credit card for the at least the price of the product and the sales tax, the sales tax associated with the one or more approved sales transactions in favor of a second account accessible over the network, the second account being different than the first account.

2. The transaction processing system of claim 1, wherein the revenue settlement module settles the revenue portion of plural approved sales transactions simultaneously in a batch.

3. The transaction processing system of claim 1, wherein the tax settlement module settles the sales tax of plural approved sales transactions simultaneously in a batch.

4. The transaction processing system of claim 1, wherein the second account belongs to a taxing authority.

5. The transaction processing system of claim 1, further comprising an interface connected to or part of the computer, the interface including at least one settlement control selectable by a user of the transaction processing system to trigger the revenue settlement module, the tax settlement module, or both, and cause a transmission over the network to settle the one or more approved sale transactions.

6. The transaction processing system of claim 5, wherein the settlement control is selectable by the user to trigger both the revenue settlement module and the tax settlement module.

7. The transaction processing system of claim 5, further comprising a database in communication with the revenue settlement module, wherein the transmission over the network includes data from the database comprising: an identifier of the first account; an identifier of the merchant that caused the transmission; an amount of the revenue portion of the one or more approved sales transactions; and a date for each respective one of the one or more approved sales transactions.

8. The transaction processing system of claim 7, wherein the transmission over the network further includes from the database a time for each respective one of the one or more approved sales transactions.

9. The transaction processing system of claim 7, wherein the transmission over the network further includes from the database a routing number of the first account.

10. The transaction processing system of claim 5, further comprising a database in communication with the tax settlement module, wherein the transmission over the network includes data from the database comprising: an identifier of the second account; an identifier of the merchant that caused the transmission; an amount of the sales tax associated with the one or more approved sales transactions; and a date for each respective one of the one or more approved sales transactions.

11. The transaction processing system of claim 10, wherein the transmission over the network further includes from the database a time for each respective one of the one or more approved sales transactions.

12. The transaction processing system of claim 10, wherein the transmission over the network further includes from the database a routing number of the second account.

13. The transaction processing system of claim 1, wherein the revenue settlement module and the tax settlement module are configured to settle the revenue portion of the one or more approved sales transactions and the sales tax associated with the one or more approved sales transactions free of any comingling.

14. The transaction processing system of claim 1, further comprising a transaction closing module operative to configure the processor to close the sale transaction in an amount up to the approval defined in the approved sale transaction.

15. The transaction processing system of claim 14, wherein the product sold to the customer is food and beverage from a restaurant and wherein the revenue portion comprises the price of the product sold to the customer and a gratuity.

16. The transaction processing system of claim 1, wherein the revenue settlement module and the tax settlement module settle with a third party credit card processor.

17. The transaction processing system of claim 1, wherein at least one of the plurality of modules configures the processor to remap one or more fields in a sales file such that a total field within the sales file comprises a sum of an amount column and a tip column from within the sales file.

18. The transaction processing system of claim 1, wherein at least one of the plurality of modules configures the processor to remap one or more fields in a sales file such that a total field within the sales file comprises a sum of a tax column from within the sales file.

19. The transaction processing system of claim 1, wherein at least one of the plurality of modules configures the processor to recalculate a total field within a sales file such that the total field comprises a sum of an amount column and a tip column from within the sales file, and omits from the recalculation a tax column from within the sales file.

20. The transaction processing system of claim 1, wherein at least one of the plurality of modules configures the processor to recalculate a total field within a sales file such that the total field comprises a sum of a tax column from within the sales file and omits from the recalculation an amount column and a tip column from within the sales file.

21. A centralized transaction processing system suitable for processing merchant transactions, the system comprising:
- a computer having a processor, a memory and a first connection over a network for receiving the merchant transactions and further connections over the network for settling the merchant transactions;
- a separator module comprising code that executes in the processor which is operative to configure the processor to separate tax amounts associated with the merchant transactions received over the first connection, the separator module including:
  - a revenue settlement module operative to configure the processor to settle a revenue portion of one or more of the merchant transactions in favor of a first account accessible over the network, the first account belonging to the merchant, wherein the revenue portion excludes the sales tax; and
  - a tax settlement module operative to configure the processor to settle the sales tax associated with the one or more of the merchants transactions in favor of a second account accessible over the network, the second account being different than the first account.

22. The transaction processing system of claim 21, wherein the revenue settlement module settles the revenue portion of plural merchant transactions simultaneously in a batch.

23. The transaction processing system of claim 21, wherein the tax settlement module settles the sales tax of plural merchant transactions simultaneously in a batch.

24. The transaction processing system of claim 21, further comprising a database in communication with the tax settlement module, wherein the merchant transaction received over the first connection includes data from the database comprising: an identifier of the second account; an identifier of the merchant that caused the merchant transactions to be received; an amount of the sales tax associated with the one or more merchant transactions; and a date for each respective one of the one or more merchant transactions.

25. The transaction processing system of claim 21, wherein the separator module configures the processor to remap one or more fields in the merchant transactions received over the first connection such that a total-field within the received merchant transactions comprises a sum of an amount column and a tip column from within the received merchant transactions.

26. The transaction processing system of claim 21, the separator module configures the processor to remap one or more fields in the merchant transactions received over the first connection such that a total-field within the received merchant transactions comprises a sum of a tax column from within the received merchant transactions.

27. The transaction processing system of claim 21, wherein the separator module configures the processor to recalculate a total field-within the merchant transactions received over the first connection such that the total-field comprises a sum of an amount column and a tip column from within the received merchant transactions, and omits from the recalculation a tax column from within the received merchant transactions.

28. The transaction processing system of claim 21, wherein the separator module configures the processor to recalculate a total-field within the merchant transactions received over the first connection such that the total-field comprises a sum of a tax column from within the received merchant transactions and omits from the recalculation an amount column and a tip column from within the received merchant transactions.

* * * * *